United States Patent [19]
Frye et al.

[11] Patent Number: 5,419,637
[45] Date of Patent: May 30, 1995

[54] METHOD AND APPARATUS FOR MEASURING TEMPERATURE USING AN INHERENTLY CALIBRATED P-N JUNCTION-TYPE TEMPERATURE SENSOR

[75] Inventors: William H. Frye, Goleta; Eric J. Woodbury, Santa Barbara, both of Calif.

[73] Assignee: Santa Barbara Research Center, Goleta, Calif.

[21] Appl. No.: 147,185

[22] Filed: Nov. 3, 1993

[51] Int. Cl.$^6$ ............................................. G01K 7/01
[52] U.S. Cl. ........................................ 374/178; 374/141
[58] Field of Search ................... 374/172, 178, 141; 257/470; 307/310

[56] References Cited

U.S. PATENT DOCUMENTS

| | | | |
|---|---|---|---|
| 3,092,998 | 6/1963 | Barton | 374/178 |
| 3,440,883 | 4/1969 | Lightner | 374/178 |
| 3,566,690 | 3/1971 | Ebrahimi | 374/178 |
| 4,021,722 | 5/1977 | Crowle | 374/178 |
| 5,195,827 | 3/1993 | Audy et al. | 374/178 |

FOREIGN PATENT DOCUMENTS

| | | | |
|---|---|---|---|
| 0019825 | 2/1984 | Japan | 374/178 |
| 2109938 | 6/1983 | United Kingdom | 374/178 |
| 0275236 | 7/1970 | U.S.S.R. | 374/178 |
| 0287362 | 11/1970 | U.S.S.R. | 374/178 |

*Primary Examiner*—Diego F. F. Gutierrez
*Attorney, Agent, or Firm*—W. C. Schubert; W. K. Denson-Low

[57] ABSTRACT

An integrated circuit, diode-based temperature sensor circuit (10) is amenable to fabrication upon a readout circuit (12) that is coupled during use to a FPA or radiation detectors. The sensor circuit is inherently self-calibrated, and provides for a cancellation of circuit offsets and other error sources. The circuit has an output that is time-multiplexed onto a data path that normally conveys a video data stream away from the readout circuit. The circuit operates to selectively forward bias a diode (D1) with two different currents. A difference between the currents is shown to indicate the temperature of the diode's p-n junction.

15 Claims, 2 Drawing Sheets

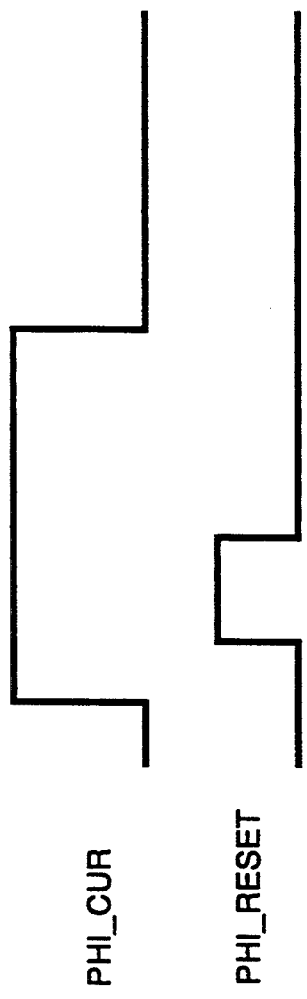
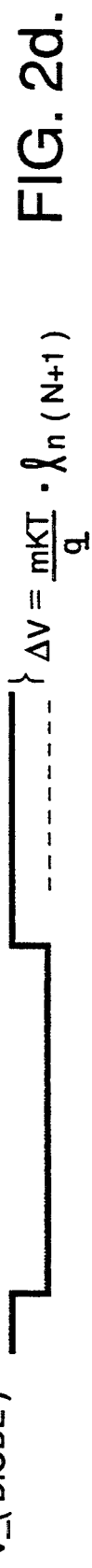
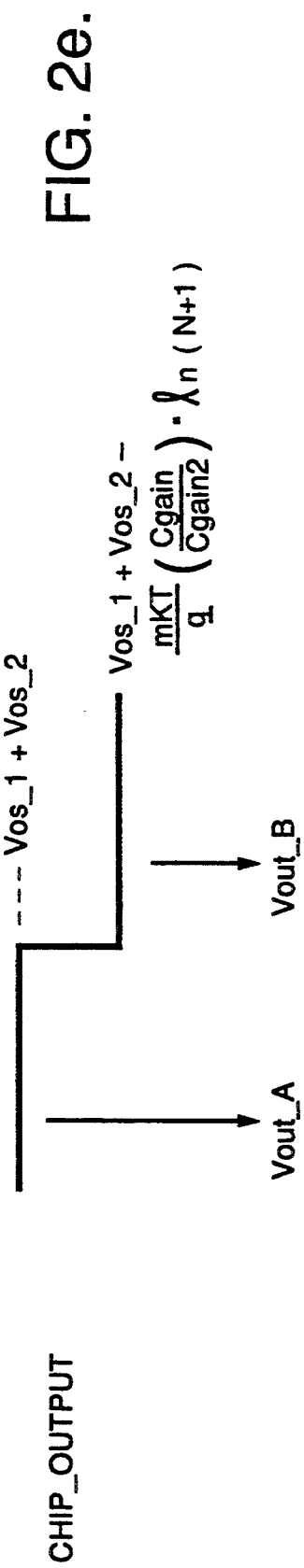
FIG. 2a. PHI_CUR
FIG. 2b. PHI_RESET
FIG. 2c. I (DIODE)
FIG. 2d. V_(DIODE)
$$\Delta V = \frac{mKT}{q} \cdot \ln(N+1)$$
FIG. 2e. CHIP_OUTPUT
$$Vos\_1 + Vos\_2 - \frac{mKT}{q}\left(\frac{Cgain}{Cgain2}\right) \cdot \ln(N+1)$$

METHOD AND APPARATUS FOR MEASURING TEMPERATURE USING AN INHERENTLY CALIBRATED P-N JUNCTION-TYPE TEMPERATURE SENSOR

FIELD OF THE INVENTION

This invention relates generally to temperature measuring circuitry and, in particular, to temperature measuring circuitry that is amenable to fabrication as an integrated circuit for use with, by example, a focal plane array (FPA) of radiation detectors.

BACKGROUND OF THE INVENTION

A FPA assembly typically includes, in addition to the FPA itself, a dewar to maintain the FPA at a desired cryogenic operating temperature, support electronics (such as readout integrated circuits), and cabling.

One off-FPA approach to providing a temperature measuring circuit for a FPA assembly employs a conventional 2N2222-type diode. A single two wire measurement is used to measure the diode voltage at a known current. As is well known, the diode voltage is a function of the temperature of the diode junction. However, this approach has been found to have several disadvantages.

For example, the diode or diodes (often two are used for redundancy) each require from two to four leads. These leads are in addition to those required to operate and convey the output signals from the FPA assembly. This arrangement can present a problem for some applications, in that the additional diode leads adversely impact the heat load, reliability, and the cost of the FPA assembly.

Another disadvantage to this conventional off-FPA approach is that the diode(s) must be individually calibrated to account for process variations. Calibration typically involves measuring the diode voltage drop (Vdiode) at a reference current, such as 1 mA. The required calibration procedure adversely impacts the cost and processing complexity of the FPA assembly.

Another technique for measuring temperature is known as an on-FPA method. This method is presently accomplished using one of several techniques: (a) an unbiased diode, a MOSFET, or a resistor on a readout integrated circuit is accessed via two pads per temperature sensor; (b) a diode, MOSFET, or resistor is biased with an on-readout current source and is then accessed in a voltage mode via one or two pads per temperature sensor; or (c) a set of diodes, MOSFETS, or resistors, along with associated current sources and buffers, are incorporated into the video data stream that is output from the FPA.

However, each of these techniques suffer from the calibration problems described above. Furthermore, methods (a) and (b) also have the disadvantage of requiring extra leads.

SUMMARY OF THE INVENTION

It is thus an object of this invention to provide a temperature measuring circuit that overcomes the foregoing and other limitations.

It is another object of this invention to provide an integrated circuit, diode-based temperature sensor that is amenable to fabrication upon a readout circuit that is coupled during use to a FPA or radiation detectors.

It is a further object of this invention to provide an integrated circuit, diode-based temperature sensor that is amenable to fabrication upon a readout circuit that is coupled during use to a FPA or radiation detectors, that does not require calibration, and that has an output that is time-multiplexed onto a data path that normally conveys a video data stream away from the readout circuit.

In accordance with the foregoing, this invention provides a temperature sensing circuit that includes a p-n junction and a biasing circuit, coupled to the p-n junction, for forward biasing the p-n junction. The biasing circuit is responsive to a first state of a control signal for providing a first forward bias current through the p-n junction, and is responsive to a second state of the control signal for providing a second forward bias current through the p-n junction. The first forward bias current results in a first potential across the p-n junction and a second forward bias current results in a second potential across the p-n junction. It is shown that a difference between the first and the second potentials is indicative of a temperature of the p-n junction.

Selective application of the control signal, in conjunction with a second control signal, enables the elimination of circuit offsets and other process-dependent error sources, thereby enabling the use of the temperature sensing circuit without requiring a calibration step.

BRIEF DESCRIPTION OF THE DRAWING

The foregoing and other aspects of this invention are made more apparent in the ensuing description of a presently preferred embodiment, when read in conjunction with the attached Drawing, wherein:

FIGS. 2a-2e are timing diagrams that depict the operation of the circuit of FIG. 1 for one temperature measurement cycle.

DETAILED DESCRIPTION OF THE INVENTION

Figure 1:
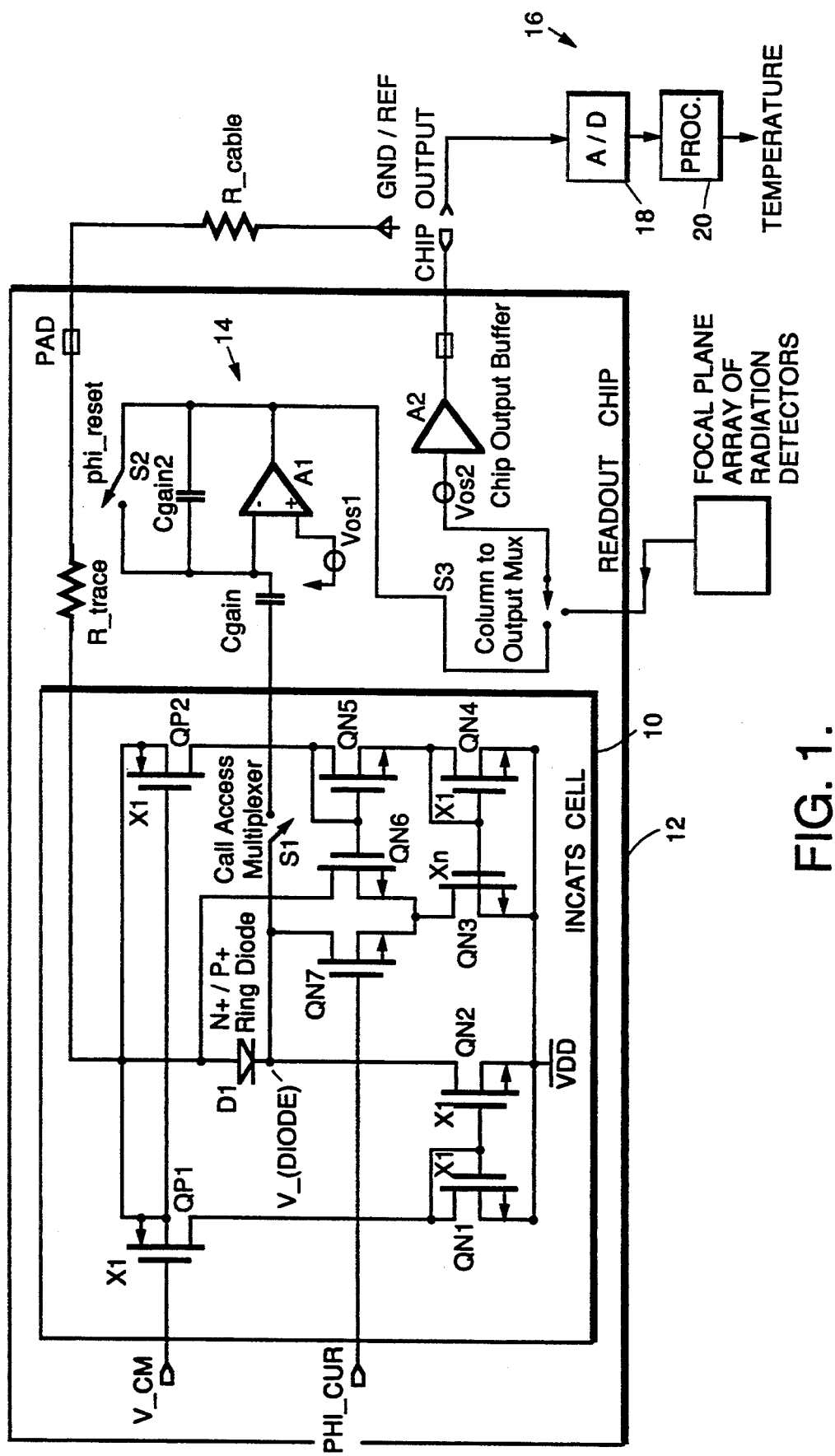
FIG. 1 is a schematic diagram of an inherently calibrated temperature measurement circuit that is constructed and operated in accordance with the teaching of this invention.

FIG. 1 illustrates an Inherently Calibrated Temperature Sensor (INCATS) cell 10 that is constructed in accordance with a presently preferred embodiment of this invention. The INCATS cell 10 is shown contained within a FPA readout integrated circuit, or chip, 12. The fabrication of the INCATS cell 10 is compatible with standard silicon CMOS processes that are employed to fabricate the readout integrated circuit 12.

Furthermore, and as will be described below, the output of the INCATS cell 10 is capable of being multiplexed into the video data stream that is output by the readout chip 12, thereby utilizing the same cabling that normally conveys the outputs of the radiation detectors of the FPA to which the readout chip 12 is coupled during use.

The INCATS cell 10 does not require calibration, and is capable of operating from ambient temperature down to at least liquid nitrogen temperatures (77K). The INCATS cell 10 is thus suitable for use with FPA readout chips that are cooled during use to cryogenic temperatures.

QP1 and QP2, each having a gain of unity, function as current mirrors that provide a current source controlled by a programming mirror (not shown) that is located external to the cell 10. The output of the programming mirror (i.e., the input to QP1 and QP2) is shown as the cell bias potential VCM. The currents in QP1 and QP2 are substantially identical at current=I. QN1, QN2, QN3 and QN4 function as current mirrors that sink currents of I for QN2 (gain of unity) and N*I for QN3 (gain of N). The use of the current mirrors serves to accurately define a ratio of currents, even though the absolute currents may vary with process or temperature.

QN6 and QN7 form a differential pair that sinks the drain current of QN3 from either the anode or cathode of a forward biased N+/P+ ring diode D1. The ring diode D1 is highly doped (e.g. $10^{17}$ atoms/cm$^3$) on both sides of the p-n junction. This provides D1 with a minimal series resistance and with a predictable forward voltage diode curve. As such, the use of ring diode for D1 is presently preferred, although other diode configurations having similar properties may be substituted. QN5 is provided to bias the gate of QN6 to 2*Vgs above the potential VDD. For the illustrated embodiment, VDD is nominally −6 volts. Consequently the forward current through D1 is equal to I,(N+1) when a cell clock signal PHICUR is high (0V), and the forward current through D1 is equal to I when PHICUR is low (+6V). In either state of PHI CUR the total current through the cell 10 (the current flowing from GND to VDD) is that flowing through QP1, D1, and QP2, or $$I_{total} = I + I*(N+1) + I = I*(N+3).$$

This configuration thus beneficially eliminates an occurrence of a changing current though the effective resistance of the on-chip trace (Rtrace) and the effective resistance of the cable (R-cable) that connects the readout chip 12 to GND. A changing current in these conductors would cause a variation in the potential across D1, and may induce an error to the ultimate temperature reading. Thus, the potential at the ground side of D1 remains constant for both states of the timing signal PHICUR, and the INCATS cell 10 presents a constant current load to the ground reference trace and cable. This serves to eliminate common ground offset errors that may be temperature dependant.

The INCATS cell 10 is selectively connected, via switch S1 (Cell Access Multiplexer), to an input capacitance Cgain of an amplifier cell 14 located on the readout chip 12. The amplifier cell 14 is comprised of a common source, actively loaded amplifier A1 having capacitive feedback represented by Cgain2. The gain of A1 is set by the ratio of the two capacitances (Gain=-Cgain/Cgain2), and is thus stable in spite of temperature and process variations. The gain of A1 is preferably set to a level above the noise floor, and to a desired signal scaling, such as 1mV=1K.

Before describing in further detail the operation of the INCATS cell 10, a description is first presented of a basic principle of operation of the INCATS cell 10.

As was stated, D1 is highly doped on both sides of the junction. This provides a diode having a minimal series resistance and a classical, and predictable, forward voltage diode curve given by:

$$Idiode = Is\, (exp(qVdiode/(mKT)) - 1),$$

where Is is the diode saturation current, q is the charge of an electron, and wherein m is nominally 1 for a diffusion limited diode.

Because D1 is forward biased at Idiode >>> Is, the equation simplifies to:

$$Idiode = Is*(exp(qVdiode/(mKT))), \text{ or}$$

$$Vdiode = mKT/q*ln(Idiode/Is).$$

Evaluating Vdifference=(Vdiode(I1)−Vdiode(I2)) gives $$Vdifference = mKT/q*ln(Idiode1/Idiode2),$$

which is independent of Is and is therefore process independent.

A circuit 16 constructed to evaluate this difference, with a known ratio of currents, is enabled to measure temperature accurately and without calibration of the diode D1. By taking the difference voltage at the end of an entire circuit chain, which itself contains temperature drift elements (thresholds, VBEs, etc . . . ), all of the temperature offsets (which would require calibration if measured at a single operating point) are removed, and an accurate temperature measured without calibration.

In operation, and referring to FIG. 2a–2e in conjunction with FIG. 1, PHICUR is made high (OV, Idiode=I*(N+1)), and a reset switch S2 (phireset) across Cgain2 is closed and then opened. Previously, a switch S3 (not shown in FIG. 2a–2e) has been closed to couple the output of A1 to the input of a readout chip output buffer amplifier A2. A2 has a gain of approximately one. During the time that reset switch S2 is closed, at the output of the readout chip 12 (CHIP OUTPUT) the voltage is:

$$Vouta = Vos1 + Vos2,$$

where Vos1 is the offset voltage associated with A1 and Vos2 is the offset voltage associated with the chip output buffer amplifier A2. Typical values for Vos1 and Vos2 are on the order of millivolts. PHICUR is then driven low (−6V), and after settling the output voltage appearing at the CHIP OUTPUT becomes:

$$Voutb = Vos1 + Vos2 - mKT/q*(Cgain/Cgain2)*ln(N+1),$$

where N is typically within a range of one to ten.

As a result, the difference voltage becomes:

$$Vdifference = Vouta - Voutb$$
$$= mKT/q*(Cgain/Cgain2), ln(N+1).$$

As can be seen, the amplifier A1 has an output of Vos1 both during and after reset. The output of A1 goes to (Vos1−mKT/q) ln(N+1),(Cgain/Cgain2) when PHICUR goes low. The change of current from I*(N+1) to I results in a diode voltage drop change of (mKT/q) ln(N+1). This voltage change is amplified and added to the amplifier offset. Vdifference is then obtained to eliminate the offset.

The (uncalibrated) temperature-dependent offset voltages of A1 and A2 are thus removed, and it can clearly be seen that the temperature of the p-n junction of D1 is the only unknown in the equation for Vdifference. Thus, the temperature of the p-n junction of D1 can be determined without requiring a calibration step, which is the desired result.

The voltages Vouta and Voutb are measured, and the magnitude of Vdifference is determined, at the end of the cable that connects the CHIP OUTPUT to the further receiver electronics 16, such as an A/D converter 18 and a signal processor 20. Preferably, the processor 20 also controls the application of the various timing signals.

In accordance with an aspect of this invention, Vouta and Voutb are driven through the same output circuit (A2) that is normally used to drive the FPA radiation detector output signals from the readout chip 12. That is, the output of the INCATS 10 is selectively multiplexed into the video data stream at the output of the readout chip 12, through the Column to Output Mux switch S3. This provides for a reduction in complexity, cabling, and overcomes a number of the problems described above.

Although the teaching of this invention has been described in the context of a FPA application, it should be understood that the use of the invention is not limited to only this one important application. That is, the foregoing description is not to be construed to limit the teaching and applicability of this invention to any one specific application, in that those having skill in the art will realize that the teaching of this invention is applicable to a number of different types of applications wherein it is desired to measure or sense a temperature. It should also be realized that various modifications to the presently preferred embodiment of the invention may occur to those having skill in the art, and that such modifications are within the scope and teaching of this invention.

What is claimed is:

1. A temperature sensing circuit integrated upon a circuit device for use in a Focal Plane Array assembly, comprising:

a p-n junction; and means, coupled to said p-n junction, for forward biasing said p-n junction, said biasing means being comprised of current mirror means that is responsive to a first state of a control signal for providing a first forward bias current through said p-n junction, said current mirror means being responsive to a second state of said control signal for providing a second forward bias current through said p-n junction, wherein said first forward bias current results in a first potential across said p-n junction, wherein said second forward bias current results in a second potential across said p-n junction, and output means for selectively providing said first potential and said second potential to measurement means that is external to said circuit device, wherein a difference between said first potential and said second potential is indicative of a temperature of said p-n junction.

2. A temperature sensing circuit as set forth in claim wherein said p-n junction is contained within a P+/N+ ring diode.

3. A temperature sensing circuit integrated upon a circuit device, comprising:

a p-n junction; and means, coupled to said p-n junction, for forward biasing said p-n junction, said biasing means being responsive to a first state of a control signal for providing a first forward bias current through said p-n junction, said biasing means being responsive to a second state of said control signal for providing a second forward bias current through said p-n junction, wherein said first forward bias current results in first potential across said p-n junction, wherein said second forward bias current results in a second potential across said p-n junction, and output means for selectively providing said first potential and said second potential to measurement means that is external to said circuit device, wherein a difference between said first potential and said second potential is indicative of a temperature of said p-n junction; wherein said biasing means includes:

a first current mirror means providing a current source;

a second current mirror means providing a current sink for said current source; and a differential transistor pair coupled across said p-n junction and to said second current mirror means, said differential transistor pair being responsive to said first state of said control signal for causing said second current mirror means to sink a current of I, said differential transistor pair being responsive to said second state of said control signal for causing said second current mirror means to sink a current of $I*(N+1)$, where N is a constant.

4. (Amended) A temperature sensing circuit integrated upon a circuit device, comprising:

a p-n junction; and means, coupled to said p-n junction, for forward biasing said p-n junction, said biasing means being responsive to a first state of a control signal for providing a first forward bias current through said p-n junction, said biasing means being responsive to a second state of said control signal for providing a second forward bias current through said p-n junction, wherein said first forward bias current results in a first potential across said p-n junction, wherein said second forward bias current results in a second potential across said p-n junction, and output means for selectively providing said first potential and said second potential to measurement means that is external to said circuit device, wherein a difference between said first potential and said second potential is indicative of a temperature of said p-n junction; and further comprising:

an amplifier having a gain set by a ratio of a first capacitance to a second capacitance, said amplifier having an input coupled to said p-n junction, through said first capacitance, and an output coupled to said input through said second capacitance.

5. A temperature sensing circuit as set forth in claim 4, and further comprising:

a switch means coupled across said second capacitance, said switch means being coupled to a signal for controllably connecting said output of said amplifier to said input.

6. A temperature sensing circuit as set forth in claim 4, and further comprising:

a switch means coupled between said p-n junction and said first capacitance, said switch means being responsive to a signal for controllably connecting said first potential and said second potential to said first capacitance for amplification by said amplifier.

7. A temperature sensing circuit as set forth in claim 4, wherein said output means includes a buffer amplifier having an input coupled to an output of said amplifier and an output.

8. A temperature sensing circuit as set forth in claim 7, and further comprising:

switch means coupled between said output of said amplifier and said input of said buffer amplifier, said switch means being responsive to a further control signal for selectively connecting said output of said amplifier to said input of said buffer amplifier.

9. An integrated circuit temperature sensing circuit, comprising:
 a p-n junction;
 means, coupled to said p-n junction, for forward biasing said p-n junction, said biasing means being comprised of current mirror means that is responsive to a first state of a control signal for providing a first forward bias current through said p-n junction, said current mirror means being responsive to a second state of said control signal for providing a second forward bias current through said p-n junction, wherein said first forward bias current results in a first potential across said p-n junction, and wherein said second forward bias current results in a second potential across said p-n junction; and
 measurement means, located external to said integrated circuit and having an input coupled to said p-n junction, for determining a magnitude of said first potential and said second potential, and for determining a difference between said first potential and said second potential, said difference being indicative of a temperature of said p-n junction.

10. An integrated circuit temperature sensing circuit as set forth in claim 9, wherein said p-n junction and said biasing means are contained within a readout integrated circuit that is coupled during use to a focal plane array (FPA) of radiation detectors, wherein said input of said measurement means is coupled to said p-n junction through an output of an amplifier contained within said readout integrated circuit, and further comprising means for switchably coupling an input of said amplifier to one of said p-n junction and signals resulting from a readout of individual ones of the radiation detectors of the FPA.

11. An integrated circuit temperature sensing circuit as set forth in claim 9 wherein said circuit presents a substantially constant current load for either state of said control signal.

12. An integrated circuit temperature sensing circuit comprising:
 a p-n junction;
 means, coupled to said p-n junction, for forward biasing said p-n junction, said biasing means being responsive to a first state of a control signal for providing a first forward bias current through said p-n junction, said biasing means being responsive to a second state of said control signal for providing a second forward bias current through said p-n junction, wherein said first forward bias current results in a first potential across said p,n junction, and wherein said second forward bias current results in a second potential across said p-n junction; and
 measurement means, located external to said integrated circuit and having an input coupled to said p-n junction, for determining a magnitude of said first potential and said second potential, and for determining a difference between said first potential and said second potential, said difference being indicative of a temperature of said p-n junction;
 wherein said p-n junction and said biasing means are contained within a readout integrated circuit that is coupled during use to a focal plane array (FPA) of radiation detectors, wherein said input of said measurement means is coupled to said p-n junction through an amplifier contained within said readout integrated circuit, and further comprising means for selectively coupling an output of said amplifier to said measurement means through a signal line that is also capable of conveying signals resulting from a readout of individual ones of the radiation detectors of the FPA; and
 wherein said amplifier has a gain set by a ratio of a first capacitance to a second capacitance, said amplifier having an input coupled to said p-n junction, through said first capacitance, and an output coupled to said input through said second capacitance.

13. An integrated circuit temperature sensing circuit comprising:
 p-n junction;
 means, coupled to said p-n junction, for forward biasing said p-n junction, said biasing means being responsive to a first state of a control signal for providing a first forward bias current through said p-n junction, said biasing means being responsive to a second state of said control signal for providing a second forward bias current through said p-n junction, wherein said first forward bias current results in a first potential across said p-n junction, and wherein said second forward bias current results in a second potential across said p-n junction; and
 measurement means, located external to said integrated circuit and having an input coupled to said p-n junction, for determining a magnitude of said first potential and said second potential, and for determining a difference between said first potential and said second potential, said difference being indicative of a temperature of said p-n junction;
 wherein said biasing means includes:
 a first current mirror means providing a current source;
 a second current mirror means providing a current sink for said current source; and
 a differential transistor pair coupled across said p-n junction and to said second current mirror means, said differential transistor pair being responsive to said first state of said control signal for causing said second current mirror means to sink a current of I, said differential transistor pair being responsive to said second state of said control signal for causing said second current mirror means to sink a current of $I*(N+1)$, where N is a constant.

14. A method of determining a temperature at a location within a Focal Plane Array assembly, comprising the steps of:
 providing a p-n junction at the location;
 activating a control signal for forward biasing the p-n junction with a first forward bias current;
 sensing, remotely from the location, a first voltage potential resulting from the first forward bias current;
 activating the control signal for forward biasing the p-n junction with a second forward bias current;
 sensing, remotely from the location, a second voltage potential resulting from the second forward bias current; and
 determining a difference between the first voltage potential and the second voltage potential, the step of determining removing substantially all voltage potentials resulting from error sources such that the difference in potentials is indicative only of the temperature at the location.; wherein the steps of sensing include a step of time multiplexing the first and second voltage potentials with output signals from a radiation detector array that forms a part of the Focal Plane Array assembly.

15. A method as set forth in claim 14 wherein the step of activating a control signal for forward biasing the p-n junction with a first forward bias current includes a step of controlling a current mirror that is coupled to the p-n junction to provide the first forward bias current, and wherein the step of activating the control signal for forward biasing the p-n junction with a second forward bias current includes a step of controlling the current mirror that is coupled to p-n junction to provide a second forward bias current.

* * * * *